I. ROSENBERG.
BUMPER.
APPLICATION FILED AUG. 13, 1921.
1,414,211.
Patented Apr. 25, 1922.
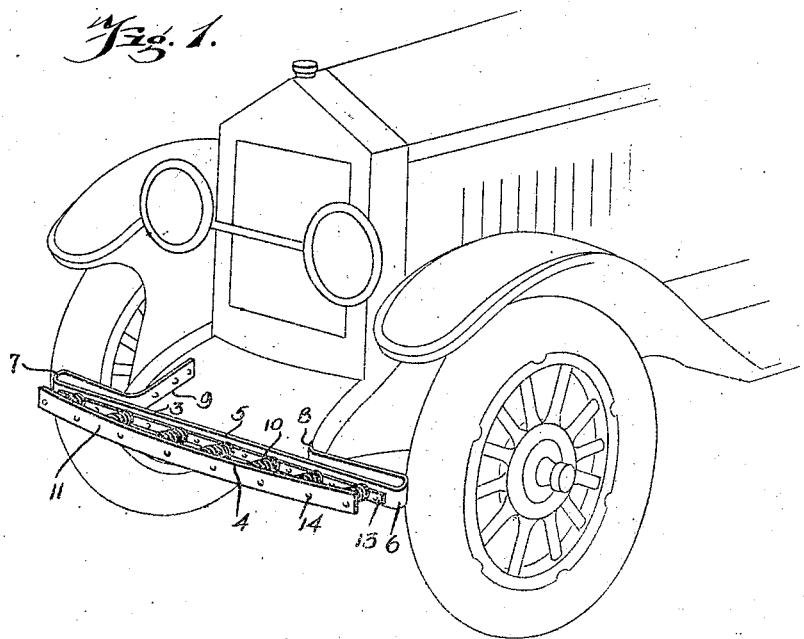
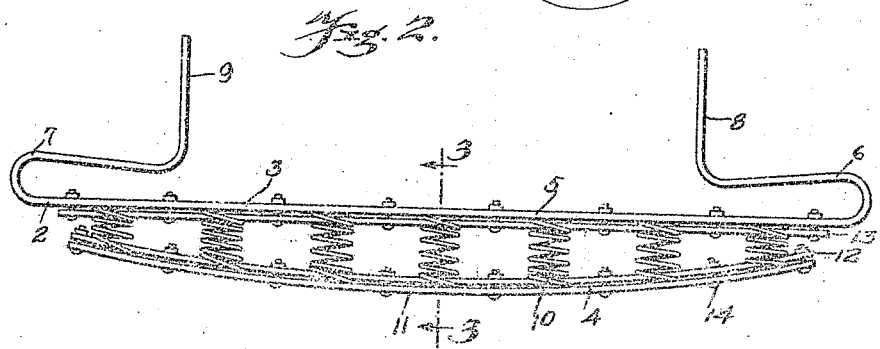
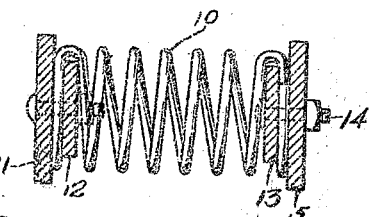
WITNESSES
INVENTOR
IRVING ROSENBERG
BY
ATTORNEYS

UNITED STATES PATENT OFFICE.

IRVING ROSENBERG, OF NEW YORK, N. Y.

BUMPER.

1,414,211.  Specification of Letters Patent.  Patented Apr. 25, 1922.

Application filed August 13, 1921. Serial No. 492,076.

*To all whom it may concern:*

Be it known that I, IRVING ROSENBERG, a citizen of the United States, and a resident of the city of New York, borough of Manhattan, in the county and State of New York, have invented a new and Improved Bumper, of which the following is a full, clear, and exact description.

This invention relates to vehicle bumpers and has for an object to provide an improved construction which may be used on an automobile or other vehicle and which when in use will protect both the vehicle and the object struck.

Another object of the invention is to provide a bumper for vehicles wherein a plurality of springs are provided to present a gradual increasing resistance when the bumper is struck or when the bumper strikes an object.

A still further object of the invention is to provide a bumper in which a plurality of independent coil springs are provided with an improved arrangement of fastening means therefor.

In the accompanying drawing—

Figure 1 is a perspective view of part of an automobile with the bumper embodying the invention applied thereto.

Figure 2 is a top plan view on an enlarged scale of the bumper shown in Figure 1.

Figure 3 is an enlarged sectional view through Figure 2 on line 3—3.

Referring to the accompanying drawing by numerals, 1 indicates an automobile of any desired kind. Connected in any suitable manner with the automobile is a bumper 2 which is formed of two principal sections, namely, section 3 which acts as a supporting section and section 4 which acts as a cushioning device. The section 3 comprises a bar 5 which may be straight as shown in Figure 2 or curved as desired, said bar merging into loop structures 6 and 7 and said loop structures in turn merging into securing extensions 8 and 9, which extensions are bolted or otherwise secured to the automobile 1. The looped members 6 and 7 present a comparatively stiff cushioning device and would act with the central section 5 as a protecting bumper if used alone though the cushioning effect would be comparatively small.

In order to increase this cushioning effect and to protect not only the automobile against injury but to protect the person or thing struck, the cushioning structure 4 is provided. This structure consists of a number of springs 10 preferably of different lengths so that the outer or contact bar 11 will be arc-shaped. The springs 10 are connected with bar 11 and bar 5 by clamping plates 12 and 13 held in place by a plurality of bolts 14. These bars are threaded through the end loops of the respective springs as indicated in Figures 2 and 3 and clamp said end loops firmly against the respective bars 5 and 11. The springs may be readily removed by removing the bolts 14. If desired, rivets or other fastening means might be used instead of the bolts 14 though bolts are preferable by reason of their easy application and removal.

By providing the coil springs 10, the cushioning effect produced will gradually increase until the springs have been completely collapsed and consequently, the momentum of the automobile will be gradually slowed down when an article is struck. This will prevent injury to the automobile and also reduce to a minimum injury to the article struck.

What I claim is:—

1. In a bumper for vehicles, a supporting frame adapted to be connected with the vehicle, said supporting frame having a bar extending transversely of the vehicle, a plurality of coil springs connected with said bar and extending horizontally with their axes substantially parallel to the longitudinal axis of the vehicle, a contact bar arranged in front of said springs, means for rigidly securing one end of said springs to said contact bar and means for rigidly securing the opposite ends of the springs to said supporting frame whereby said contact bar is resiliently supported and maintained in position by said springs.

2. In a bumper for vehicles a supporting bar connected with the vehicle, a contact bar spaced from the first mentioned bar, a plurality of coil springs arranged between said bars, a tie rod extending through said springs adjacent each end, and means for connecting the respective tie rods with the respective bars.

3. In a bumper for vehicles a bar adapted to be connected with the vehicle, an arc-shaped contact bar, a plurality of springs arranged between said bars, said springs being of different lengths with the longest spring in the center and the shortest at the end, and means for removably connecting said springs with the respective bars.

4. In a bumper for vehicles a bar adapted to be connected with the vehicle, a contact bar spaced from the first mentioned bar, a plurality of coil springs having the respective ends engaging the respective bars, a tie rod arranged adjacent each of said bars and extending through the end loops of said springs for clamping the ends of the springs to the respective bars, and a plurality of bolts for each tie rod for clamping them to the respective bars.

IRVING ROSENBERG.